Jan. 31, 1928.

F. KADE 1,657,677

COMPENSATED INDUCTION MOTOR

Filed March 26, 1924

INVENTOR:

Friedrich Kade

Patented Jan. 31, 1928.

1,657,677

UNITED STATES PATENT OFFICE.

FRIEDRICH KADE, OF KIEL, GERMANY, ASSIGNOR, BY MESNE ASSIGNMENTS, TO DEUTSCHE WERKE KIEL AKTIENGESELLSCHAFT, OF DEUTSCHE WERK, KIEL, GERMANY, A CORPORATION OF GERMANY.

COMPENSATED INDUCTION MOTOR.

Application filed March 26, 1924, Serial No. 702,158, and in Germany April 6, 1923.

This invention relates to so-called compensated induction motors (according to Heyland and others), whereby a small auxiliary winding is placed adjacent to the primary winding which is supplied by the mains of the alternating current supply circuit, said auxiliary winding being connected to a commutator and feeding by means of brushes bearing thereon a secondary winding. The commutation of such a machine will in general not be as good as would be required for this special motor in order to meet all ordinary operating requirements. If a motor of this kind shall replace the normal polyphase motor its safety of operation must be increased to the highest possible degree and for this reason it will be necessary to render the commutator as safe as possible and especially to protect the commutator and its winding against undue current and reduce the sparking to the smallest possible amount.

Since the speed of the rotary field in the stator will be approximately equal to the speed of the rotor when rotating at normal speed, no difficulties regarding sparking will be encountered during normal operation of the motor. At starting, however, the speed of the rotary field in the stator relatively to the rotor will correspond to the full frequency of the line and consequently generate during starting and at low speeds an essentially greater E. M. F. in the commutator-winding than at full speed, this E. M. F. resulting in a relatively large shortcircuit-current and consequent greater tendency of sparking than at higher speeds or full speed of the motor.

Figure 1:
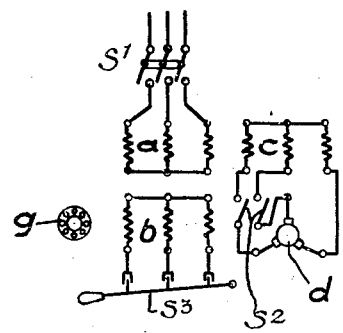

My invention will be more fully understood by reference to the accompanying drawing which shows a number of modifications of my present motor in a diagrammatic way. Fig. 1 represents a motor having a primary or stator-winding $a$, an auxiliary winding $c$ adjacent thereto, a commutator-winding connected to the commutator $d$ which is supplied from said auxiliary winding $c$, and a secondary closed winding $b$, and an additional cage-winding adjacent to the secondary winding $b$, Fig. 2 a motor comprising the windings $a$, $b$, and $c$ and the commutator $d$, the cage-winding $g$, and switches $s_1$, $s_2$ and $s_3$ which are positively connected with each other for supplying the primary winding $a$, for closing the circuit of the auxiliary winding $c$ and the commutator winding $d$, and for short-circuiting the secondary winding $b$ and, Fig. 3 a motor with the windings $a$, $b$, $c$ and $g$ of Fig. 2 together with a switching device (controller) for operating the motor in a predetermined sequence of switching operation.

The coils of the commutator-winding and the segments of the commutator are kept free from the working current by dispensing altogether with the starter and providing instead thereof as shown in Fig. 1 an auxiliary cage winding in the secondary member of the motor, the resistance of said cage winding being so chosen that upon closing of the main switch the motor will develop a strong torque, without, however, taking up an excessive current. Since in such case no starter is necessary, the working current circuit $b$ may be made without slip-rings by providing only short-circuit contacts $s_3$, which are closed as soon as the motor has come up to speed by means of the auxiliary cage winding $g$. The starting of the motor of this kind is simply accomplished in such a way that the main switch $s_1$ is closed. The connection between the commutator-winding $d$ and the auxiliary winding $c$ on the stator is thus at first still interrupted by the switch $s_2$ and the motor will come up to speed with the auxiliary cage winding like a squirrel-cage motor. As soon as the motor has reached its final speed, the auxiliary circuit must be closed and the short-circuiting contacts $s_3$ of the rotor-winding $b$ for the working current must be connected with each other.

Figure 2:
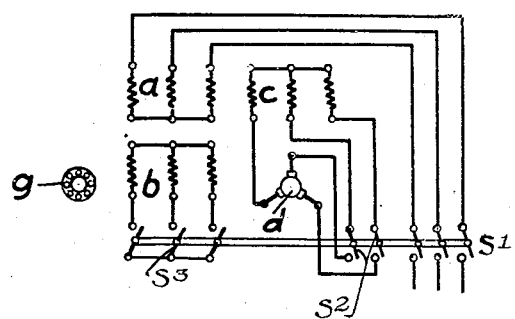
Figure 3:
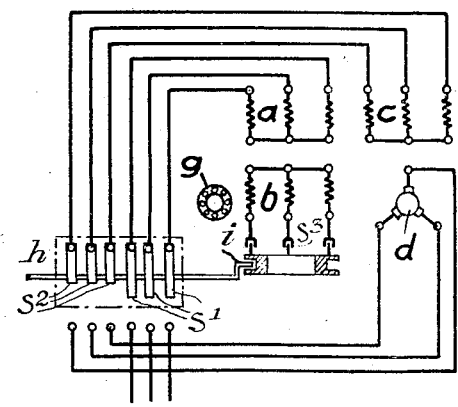

It is preferable to provide a positive connection between the switches $s_1$, $s_2$ and $s_3$ such as is indicated diagrammatically in Fig. 2. For making the connections it is advantageous to mount the controller upon the motor as indicated in Fig. 3 which represents the controller developed out in a plane. The controller comprises the contacts $s_1$ for the connection with the mains as well as the contacts $s_2$ for connecting the auxiliary stator winding $c$. The positive connection between the controller and the short-circuiting device $s_3$ is represented by the crank arm $i$ in the drawing.

If the fuses which are ordinarily employed between the line and the motor are also mounted upon the casing of the motor, a motor is obtained which may be readily connected at any point of an alternating current line without any further auxiliaries by merely connecting the three terminals of the motor with the mains of the alternating current line. The starting and operating of a motor of this kind requires no skill whatever, since all switching operations can only be performed in proper sequence according to Figs. 2 and 3. According to my invention, therefore, a motor will be provided which on account of the working current circuit being permanently closed will carry current in all operating conditions and cause not only an entirely sparkless commutation but also avoid any excess of current in the commutator segments or the winding connected thereto.

Having thus described my invention I do not wish to be understood as limiting myself to the exact forms which are shown in the drawing or described in the above specification, since many modifications may be made thereon without departing from the spirit of my invention or sacrificing any of its advantages. In particular, when claiming certain windings or other devices for the stator or primary member or for the rotor or secondary member of my motor, it must be understood that the functions of these members may well be interchanged, thus obtaining a type of motor which is supplied from the line by way of the rotor, then acting as the primary, and in which the stator again is supplied as secondary member from the rotor.

I claim:

A compensated induction motor for single-phase or poly-phase alternating current, provided with a primary or stator winding, an auxiliary stator winding, a rotor having a commutator connected with a commutator winding, brushes on the commutator connected with the auxiliary stator winding, a low resistance, normally open circuited working winding on the rotor and connected with short circuiting contacts, and a high resistance squirrel cage winding adapted to start the motor.

In testimony whereof I have hereunto affixed my signature.

FRIEDRICH KADE.